UNITED STATES PATENT OFFICE.

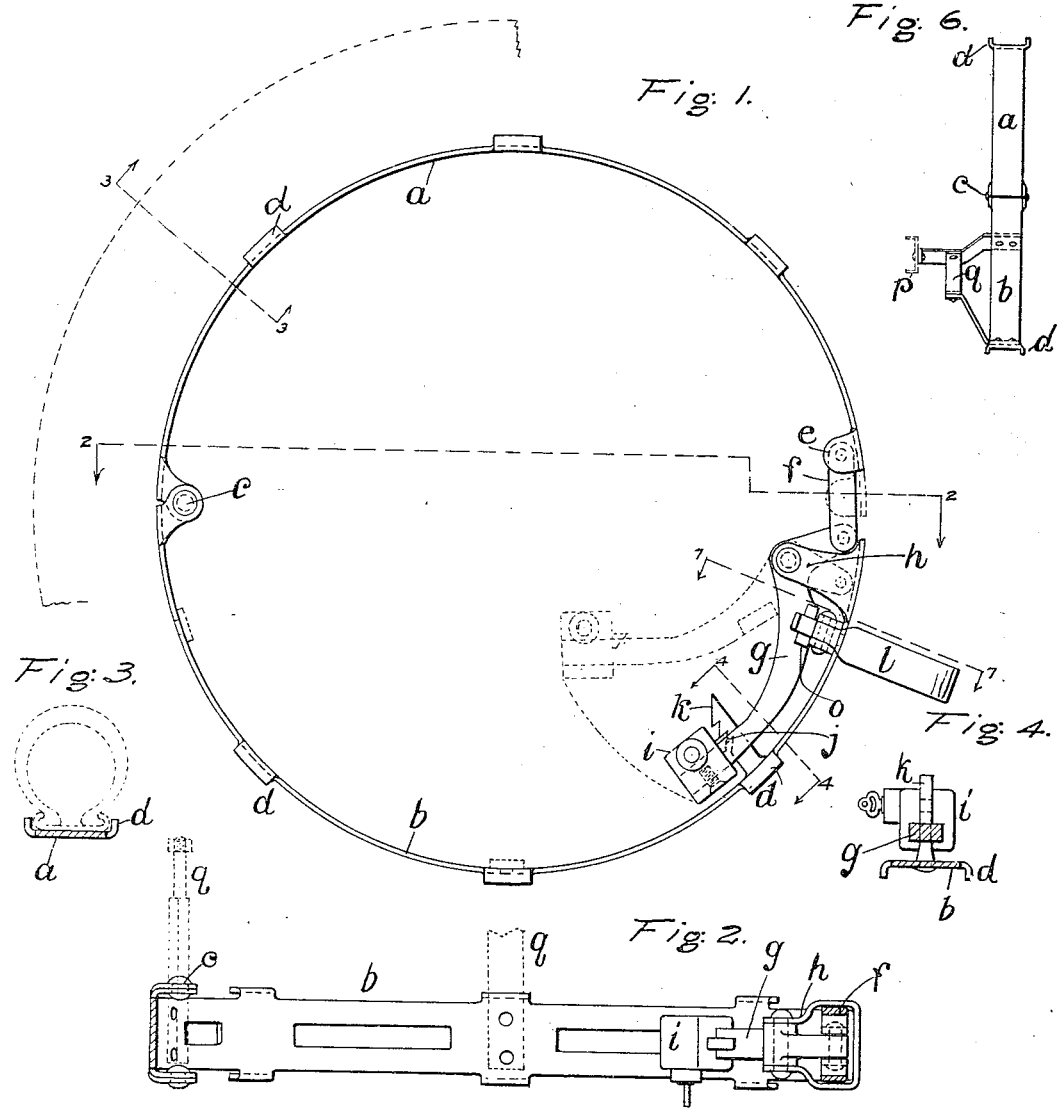

WILLIAM W. SABIN, OF PORTLAND, OREGON.

EXTRA-TIRE OR DEMOUNTABLE-RIM CARRIER FOR AUTOMOBILES.

1,238,200.

Specification of Letters Patent.  Patented Aug. 28, 1917.

Application filed January 13, 1917. Serial No. 143,167.

*To all whom it may concern:*

Be it known that I, WILLIAM W. SABIN, a citizen of the United States, and a resident of the city of Portland, county of Multnomah, State of Oregon, have invented a certain new and useful Improvement in Extra-Tire or Demountable-Rim Carriers for Automobiles, of which the following is a specification.

The object of my invention is to provide, on motor vehicles, lock controlled means for securely carrying an extra tire or demountable rim; furthermore, to make these means of simple construction and operable by a single movement of a hand lever. Also to include in these holding means a pair of grasping members which will firmly clasp the tire supported by my carrier when the latter is in its locked state, and so arrange the parts that said grasping members will be firmly wedged against reverse movement until the carrier is unlocked.

I obtain these objects of my carrier by the means illustrated in the accompanying drawings, and hereinafter fully described in such drawings:

Figure 1 is a side elevation of my carrier by itself, that is, not including the means for supporting the same on the auto vehicle; the dotted lines showing the action of certain parts;

Fig. 2 is a sectional plan view approximately taken on the line 2—2 of Fig. 1, and looking in the direction pointed by the arrows;

Fig. 3 is a section taken on the line 3—3 of Fig. 1, looking in the direction pointed by the arrows;

Fig. 4 is a section on the line 4—4 of Fig. 1, looking in the direction pointed by the arrows, and in so doing gives a side elevation of the locking means included within my carrier;

Fig. 5 shows a blank for constructing the two halves of my carrier;

Fig. 6 shows in reduced view the manner in which my carrier is supported by the frame of the auto vehicle; and Fig. 7 is a section of the line 7—7 of Fig. 1, looking in the direction pointed by the arrows.

My carrier comprises two hoop-like halves, $a$, $b$, hinged together at $c$. Each of the halves is made with retaining flanges as $d$. The free end of the upper half $a$ is provided with ears $e$, between which is hinged a link $f$, and the opposite end of this link is hinged to the short arm of a locking lever $g$; the latter being fulcrumed between posts or bearings $h$ provided on the free end of the lower half $b$. To the outer end of the locking lever $g$ is secured a lock $i$, which includes a projected bolt $j$ adapted for being brought into locking engagement with the locking post $k$. Near the bearings $h$ there are fulcrumed on the sides of the lower half $b$, tire, or demountable-rim grasping members $l$, $l$, the free ends of which are arranged as shown at $m$ in Fig. 7, so as to encompass the tire, and the short arms $n$ are constructed in the form of cams so as to coöperate with the wedge-block $o$ carried by the locking lever $g$.

When the locking lever $g$ is arranged in its unlocking position the upper half $a$ of the carrier will be drawn down contracting the hoop-like form, the tire or demountable rim may then be inserted in place on my carrier, arranging the tire or demountable rim as illustrated by Figs. 3 and 7; and by then bringing the locking lever $g$ into its locking position the upper half $a$ of the carrier is lifted, and the carrier is expanded within the tire or demountable rim; and when so expanded the flanges $d$ at the sides of the carrier parts, $a$, $b$, will hold the tire or demountable rim carried by my carrier against removal, as illustrated in Fig. 3. Simultaneously with the placing of the locking lever $g$ in its locking position, the wedge block $o$ of the lever $g$ will be inserted between the cam ends $n$ of the grasping members $l$, $l$, and grasp the tire as illustrated in Fig. 7, in so doing affording additional security against the removal of the tire from the carrier.

My carrier may be supported on the auto vehicle as shown in Fig. 6, in which $p$ represents a part of the auto frame, $q$ a supporting bracket fastened to such frame part, and my carrier is fastened to the bracket $q$ as shown.

In the blank representing the construction of the lower half $b$ of my carrier, the parts stamped out for forming the flanges $d$, ears $e$, and bearings $h$, are lettered to correspond with such parts.

What I claim is as follows:

In an extra tire or demountable rim carrier for automobiles, two hoop like halves hinged together at one end of each half, the other two ends united together forming a complete hooplike form by means of a link hinged to an ear on the end of the upper half, said link hinged to the short arm of the locking lever, the said locking lever hinged to an ear on the end of the lower half, a lock on the free end of the locking lever, a locking post having thereon teeth attached to the lower half projecting inwardly for locking engagement with the projecting bolt of the lock, a wedge block attached to the locking lever, two grasping fulcrumed oppositely arranged members hinged to the sides of the lower half near the end, the short arms thereof forming cams so as to coöperate with the wedge block carried by the locking lever giving to the free ends of the grasping fulcrumed members opening and closing motion, so as to encompass the demountable rim or tire when in its locking position, and three pairs of retaining flanges attached to each of the hoop like halves.

In testimony whereof, I have hereunto set my hand in the presence of two subscribing witnesses.

WILLIAM W. SABIN.

Witnesses:
E. S. PECHIN,
M. THAYER.